United States Patent [19]

Culkin

[11] Patent Number: 4,639,300

[45] Date of Patent: Jan. 27, 1987

[54] METHOD AND APPARATUS FOR ELECTROFILTRATION

[75] Inventor: Joseph B. Culkin, Wilton, Conn.

[73] Assignee: Dorr-Oliver Incorporated, Stamford, Conn.

[21] Appl. No.: 736,604

[22] Filed: May 21, 1985

[51] Int. Cl.⁴ ............................................. B01D 13/02
[52] U.S. Cl. ................................. 204/182.3; 204/151; 204/152; 204/182.4; 204/182.2; 204/301
[58] Field of Search ............ 204/149, 151, 152, 182.1, 204/182.2, 182.3, 182.4, 301

[56] References Cited

U.S. PATENT DOCUMENTS

| | | | |
|---|---|---|---|
| 2,085,537 | 6/1937 | Lyons | 204/182.2 |
| 3,980,547 | 9/1976 | Kunkle | 204/301 |
| 3,986,951 | 10/1976 | Fremont | 204/152 |
| 4,003,819 | 1/1977 | Kunkle et al. | 204/301 |
| 4,101,400 | 7/1978 | Pepping | 204/182.2 |
| 4,107,026 | 8/1978 | Freeman | 204/182.2 |
| 4,110,189 | 8/1978 | Kunkle et al. | 204/182.2 |
| 4,132,626 | 1/1979 | Kunkle | 204/182.2 |
| 4,168,222 | 9/1979 | Freeman | 204/152 |
| 4,170,529 | 10/1979 | Freeman | 204/182.2 |
| 4,180,451 | 12/1979 | McRae | 204/301 |
| 4,207,158 | 6/1980 | Freeman | 204/301 |
| 4,376,022 | 3/1983 | Porta et al. | 204/182.2 |

Primary Examiner—Terryence Chapman
Attorney, Agent, or Firm—Gary R. Plotecher; Paul D. Greeley; Burtsell J. Kearns

[57] ABSTRACT

This invention relates to a system and method for rapidly and efficiently dewatering or separating particles by electrofiltration in which the suspension of solids is first demineralized.

The suspension of solids may be demineralized by electrodialysis, dialysis, filtration, diafiltration or washing on a rotating-drum continuous-suction filter.

12 Claims, 8 Drawing Figures

METHOD AND APPARATUS FOR ELECTROFILTRATION

BACKGROUND OF THE INVENTION

This invention relates to a system and method for dewatering or separating particles from a demineralized liquid or colloidal suspension which uses an electrofilter assembly for attracting the particles.

Almost every particle occurring in nature has an inherent electrical charge. This charge can be utilized to achieve a separation as in electrophoresis. Electrophoresis is the movement of charged particles in a conductive liquid or colloidal suspension within an electric field. Charge on the particles may be altered by changing the pH, conductivity, temperature or composition of the solution to be separated. Electroosmosis is the movement of liquid as a function of an applied electric field. The rate of movement of the particles or molecules is generally directly proportional to the amount of applied field (voltage). Another factor which influences rate is the size of the particles or molecules.

When charged particles are placed between the anode and cathode of an electrochemical cell, the particles will tend to migrate towards an electrode as a function of their charge. For example, kaolin clay particles dispersed in water at pH 7 are negatively charged so they migrate towards the anode. Liquid near the particles tend to move towards the cathode. Salts, such as sodium chloride, will be ionized and the ions will move towards the electrode of opposite charge.

Accordingly, the kaolin clay dispersion can be dewatered and demineralized by placing the clay suspension within an electrochemical cell and applying a direct current. The clay particles settle or deposit on the anode surface and on each other, displacing water or liquid molecules to form a more dense, cake layer or slurry with a higher solids content than that of the liquid or aqueous suspension. The anode is removed from the cell and the dense layer of clay particles is recovered by removing the layer from the anode. The water is collected and removed at the cathode.

Variables affecting the performance of an electrochemical cell include the surface area of the electrode, the presence of and nature of the catalyst metal and/or conductive metal of the electrode, contaminants in the reactants and the nature of the reactions taking place in the cell. It is always desirable to not only improve the stability of the electrode and other elements of the electrochemical cells, but to improve the rate of operation and efficiency of the electrochemical cell and the quality of the resulting product.

It is therefore an object of the present invention to provide an electrofiltration system and process which increases the throughput during electrofiltration.

Accordingly, another object of the present invention is to provide an electrofiltration system and process which increases the efficiency and rate of dewatering during electrofiltration.

It is yet another object of the invention to provide an electrofiltration system and process which improves the kaolin clay product during electrofiltration.

SUMMARY OF THE INVENTION

This invention relates to a system and process for rapidly and efficiently dewatering or separating particles by electrofiltration in which the suspension of solids, such as a kaolin clay suspension, is first demineralized.

The suspension of solids may be demineralized by electrodialysis, dialysis, filtration, diafiltration or washing on a rotating-drum continuous-suction filter. By first lowering the conductivity of the solution to be electrofiltered, the electrofiltration system and process, according to the present invention, increases the throughput during electrofiltration.

BRIEF DESCRIPTION OF THE DRAWING

FIG. 4b is a cross-sectional view along line I—I of FIG. 4a;

DETAILED DESCRIPTION OF THE INVENTION

The present invention is a system and process for rapidly and efficiently "dewatering" or separating particles in a suspension of solids from the carrier liquid.

Figure 1:
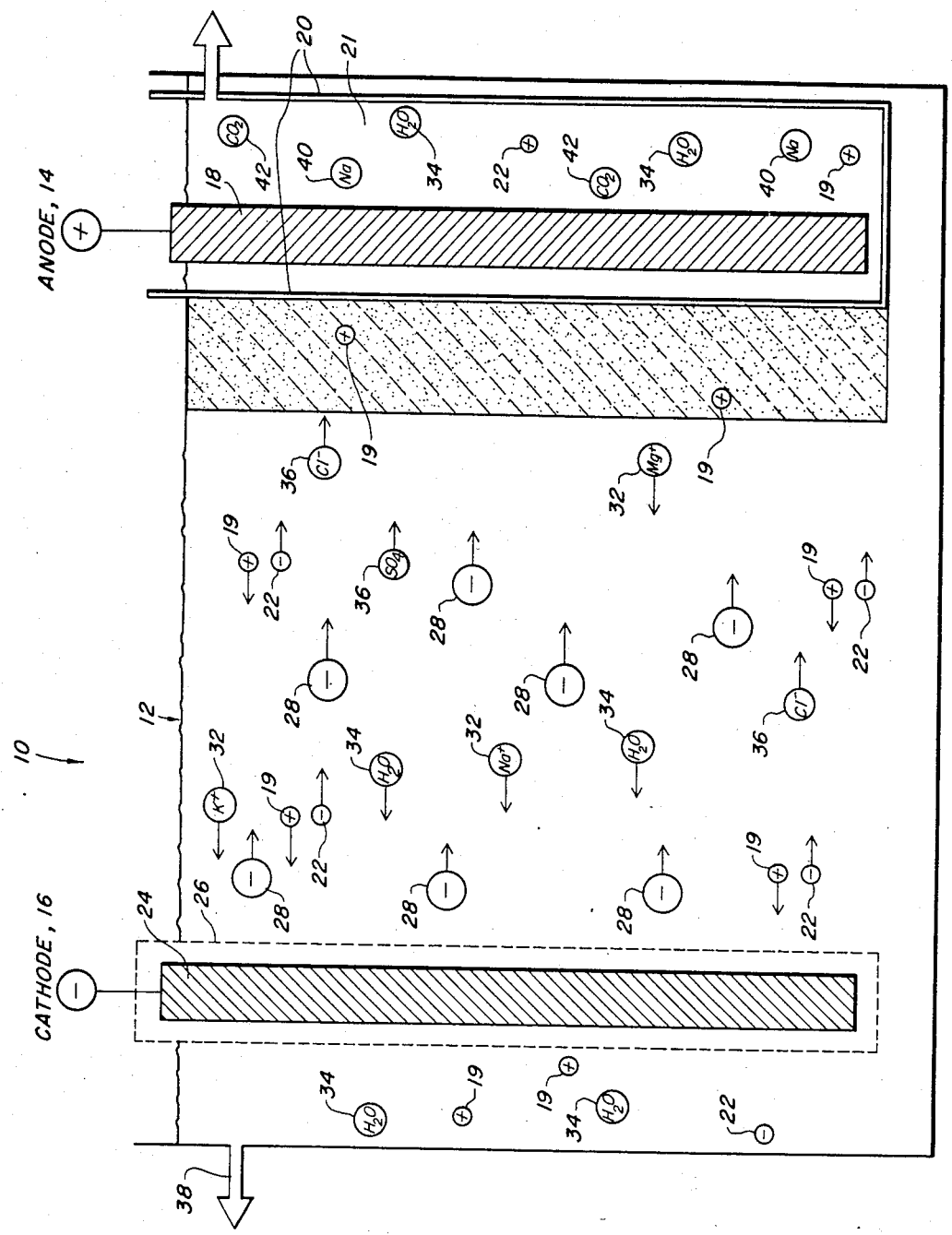
FIG. 1 is a prior art drawing of an electrofiltration apparatus containing a suspension of large negative particles and ionized salts in a carrier liquid.

In the prior art, a suspension of solids could be dewatered by placing the suspension in an electrofilter, such as the one shown in FIG. 1, and subjecting it to a direct electric current.

When the electrofilter 10 is subjected to a direct current, charged molecules in the suspension 12 migrate towards either the anode 14 or the cathode 16.

In the system for the dewatering of kaolin clay, the anode 14 consists of a sheet 18 of a metal, such as titanium covered with a protective alloy to shield the metal against the acid H+ ions 19 and other corrosive reaction products of its environment, and a hard, ion-selective membrane shell 20. This shell 20 primarily serves to retain the anolyte 21. It is formed from a cation exchange resin so that anions, such as OH− 22 molecules formed by hydrolysis at the electrodes 14 and 16 of the cell 10, cannot pass through the membrane 20. The cathode 16 also consists of a metal or graphite sheet 24 and is covered with a liquid porous material 26 which allows passage of the carrier liquid of the suspension 12, but not the larger clay particles 28.

Because the clay particles 28 have a negative charge, they migrate towards the anode 14. As they build up on the surface of the anode shell 20, they form a thick slurry or cake 30. This cake 30 is periodically removed by scraping or other methods commonly known in the art.

Other molecules found in the clay suspension 12 are also ionized and migrate towards the anode 14 or cathode 16. Clays are water insoluble, hydrated silicates of alumina with amphoteric acid properties. In addition to the silicates of alumina, natural clays may contain up to 10% metals, particularly alkalies, such as sodium and potassium, and alkaline earths, such as magnesium, calcium, and barium, present predominately as salts. During electrofiltration, the metal ions 32 and water molecules 34 move towards the cathode 16 and the soluble anions 36 move towards the anode 14. The direction of movement of these molecules is shown by the arrows in the figure. Excess water or carrier liquid is removed at the cathode by a port 38.

The anolyte 21 is usually comprised of an alkali (column IA of the Periodic Table) or alkaline earth (column IIA of the Periodic Table) metal which is capable of forming a soluble hydroxide in solution. An example of such a metal is sodium, usually added as NaOH or $Na_2CO_3$. These compounds dissociate to form cations 40 and anions 42 such as $Na^+$ and $OH^-$ or $CO_3^-$. The anolyte is carefully chosen for high conductivity and compatibility with the electrode element.

A problem with this method for dewatering a kaolin clay suspension is that the metal contaminants, in the form of hydroxides, are not only low in solubility, but influence the properties of the clay dispersion so that yield and mobility of the clay particles are decreased.

It has been discovered that the throughput capacity of a given electrofiltration process for the dewatering of a colloidal suspension is proportional to zeta potential, and inversely proportional to the feed conductivity, all other things remaining the same. Feed conductivity is the conductivity of the solution to be electrofiltered as measured in mhos or Siemens.

The conductivity of the suspension is decreased prior to electrofiltration by demineralizing the suspension to remove the ionic contaminants. If the operating current density is maintained at the same level, the amount of clay which can be processed is increased. The throughput capacity increases because the field strength resulting from a given operating current density is inversely proportional to the feed conductivity. It is the field strength, and not the current density, which determines the speed with which solids move toward the anode, and therefore also determines the throughput capacity of the machine.

The efficiency of the process is improved as well, because the power consumed per unit of solids throughput is proportional to the current only.

In addition to increasing throughput, another advantage of demineralizing or desalting the kaolin clay before electrofiltration is that there is less contamination of the electrolytes from the metal ions and hydroxides. The efficiency of the system is increased and the rate of corrosion or occlusion of the electrodes is decreased as a result.

The improved process for electrofiltration consists of making a kaolin clay suspension; demineralizing the clay slurry; and electrofiltering the clay slurry. Demineralization can be performed by any of several methods known in the art. For example, electrodialysis, dialysis, filtration, diafiltration or washing on a rotary-drum continuous suction filter may be used to remove the metals from the kaolin clay.

Electrodialysis is a process in which solutions can be desalted or demineralized using direct current electrical energy as a driving force. The key to the process is an ion exchange membrane which allows passage of either cations or anions while excluding passage of ions of the opposite charge. Those membranes which are permeable to cations are called cation membranes and those permeable to anions are called anion membranes.

Figure 2:
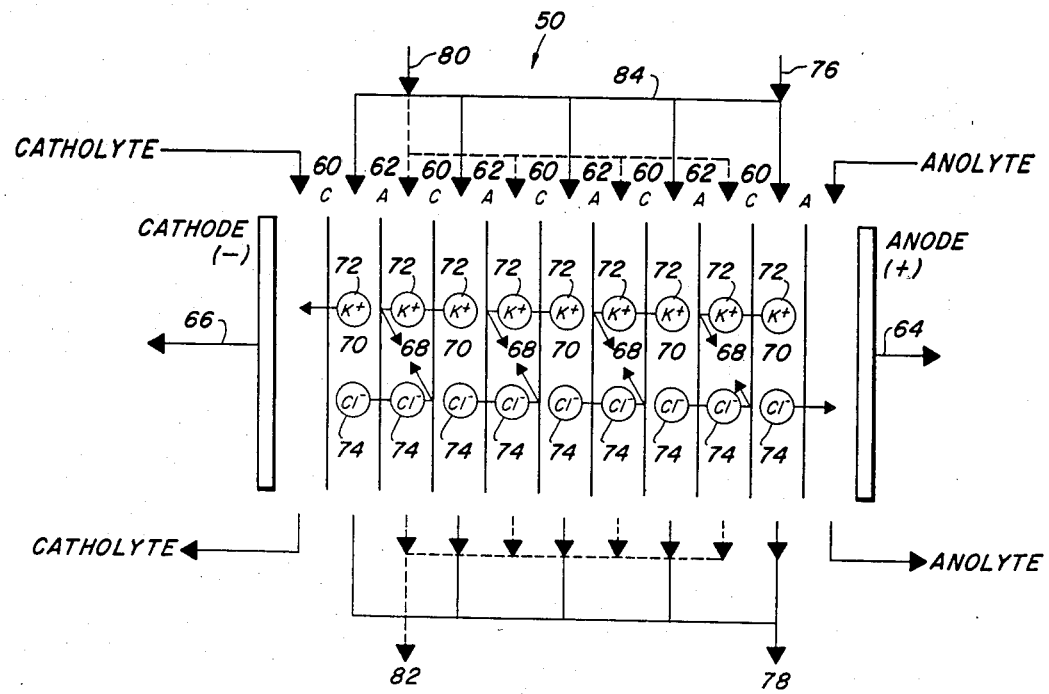
FIG. 2 describes an embodiment of the present invention wherein electrodialysis is used to demineralize a suspension of solids.

A schematic diagram of an electrodialysis process is provided in FIG. 2. For desalting by electrodialysis, cation membranes 60 and anion membranes 62 are alternately arranged between intermembrane spacers or compartments in a stacked configuration with a positive electrode 64 at one end and a negative electrode 66 at the other end. A cell pair is comprised of one concentrating cell 68 and one diluting cell 70. Several cell pairs arranged between electrodes are called an electrodialysis stack 50.

When a DC voltage is applied, cations 72 will migrate towards the cathode 66 and anions 74 will migrate towards the anode 64. Cations 72, moving towards the cathode 66, pass through the cation permeable membrane 60, but are stopped by the anion permeable membrane 62. Conversely, anions 74 will pass through the anion permeable membrane 62 but are stopped by the cation permeable membrane 62. Thus, the intermembrane compartments become either ion-gaining compartments 68 or ion-losing compartments 70. When a solution containing salts or minerals 76 is fed into the ion-losing compartments 70, it leaves the stack as a demineralized product 78. The solution 80 fed to the ion-gaining compartments 68 picks up the transferred ions and leaves the stack as a concentrated effluent 82. The ions 72 and 74 moving out of the diluting chambers 70 carry some water along with them resulting in a slight concentration of the product and dilution of the pickup solution 82. The water thus removed is called endoosmotic water. This phenomena of electrodialysis provides specific advantages over dialysis or ion exchange procedures which result in dilution.

The two end electrode compartments 66 and 64 are separated by membranes 60 and 62 from other concentrating compartments. As a result, the incidental reaction products formed at the electrode 64 and 66 are kept separate from the process streams 78 and 82.

The demineralizing compartments 68 in the electrodialysis stack 50 are fed in parallel from a common manifold 84. The ion gaining compartments 68 are also fed in parallel from a separate common manifold 86. The percent of salt or minerals removed from solution 76 as it passes through the demineralizing compartments 70 varies considerably, depending on absolute salt concentration, current density, solution temperature and fluid velocity. For higher salt removal requirements, the electrodialysis stack 50 can be assembled having sections of compartments 68 and 70 which are fed in parallel and manifolded in series with other sections of compartments 68 and 70 in the stack.

Using this method, a kaolin clay suspension can be fed into an electrodialysis stack, and the metal ions removed by the application of a direct current. Under the influence of the direct current, the ions move out of the kaolin clay suspension into a pick-up solution. The demineralized kaolin clay suspension can then be fed directly into an electrofiltration apparatus for removal of carrier liquid.

Figure 3:
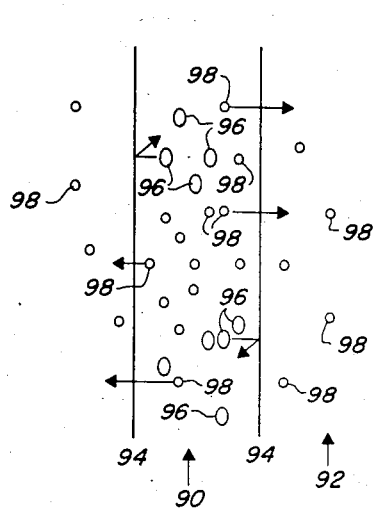
FIG. 3 describes another embodiment of the present invention wherein dialysis is used to demineralize a suspension of solids.

A kaolin clay suspension can also be demineralized or desalted by dialysis. As shown in FIG. 3, dialysis is a process whereby molecules go from a solution 90 of greater concentration through a liquid porous membrane 94 to a solution 92 of lower concentration. A concentration gradient serves as the driving force. The liquid porous membrane 94 has a specific molecular weight cut off so that the desired particles 96, such as the large clay particles, are retained and those molecules 98, of a molecular weight less than the cut off of the porous membrane 94, are free to move into the solution 92 with a lower concentration of molecules 98.

The kaolin clay suspension may also be demineralized or desalted using a rotating drum continuous suction filter.

Figure 4B:
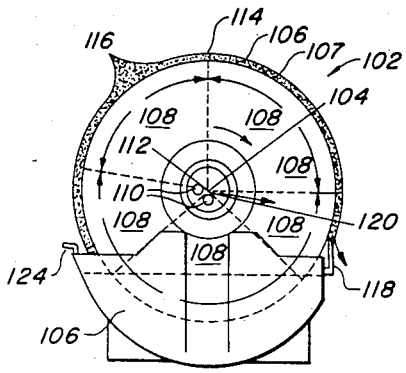
Figure 4A:
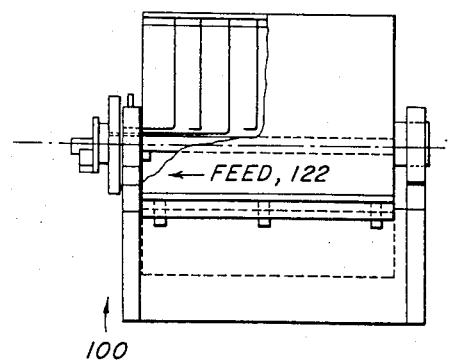
FIG. 4a describes another embodiment of the present invention wherein a rotating-drum continuous-suction filter is used to demineralize a suspension of solids.

The rotary drum suction filter 100, as shown in FIGS. 4a and 4b, consists of a cylinder 102 lying on its side and rotating about its axis 104. The cylinder 102 is mounted on a horizontal shaft 104 set on a slurry tank 106 in which the cylinder or drum 102 dips to varying depths. The surface 106 of the cylinder 102 is made up of compartments 108 which are shallow and terminate in a pump running first radially and then turning along the shaft to reach the stationary part of an automatic valve 110. The compartment 108 offers numerous points of support to the filter medium 107, a cotton filter cloth, for example, which covers in one piece the entire surface 106 of the cylinder. As the drum compartment enters the slurry 106, the automatic valve 110 connects the suction line to it, filtrate is drawn in and pulled to a separator/receiver. The cake 114 is deposited against the surface. This continues while the compartment is submerged. The suction remains connected for a short distance after it emerges in order that all adhering filtrate may be sucked in. A spray of water 116 meets the compartment as it slowly rises away from the tank. Suction is again applied by the automatic valve 110. The wash water 116 is sucked in, along with all the water-soluble minerals and salts, and pulled away through a second line to a second separator/receiver and pump. The cake now approaches the discharge knife 118. A pressure line 120 brings a positive pressure air force, shown by the arrow, which bulges the filter cloth 107 outward, loosing the cake 114 so that it is scraped off with comparative ease when it reaches the knife 118.

The slurry line 122 feeds the tank 106 at a rate which is a little greater than that of filtration so that the level remains constant with the aid of an overflow tube 124. The tank 106 is agitated to prevent any settling. The level selected will depend upon the percentage of solids in the slurry. For a thin slurry, a high level will be maintained. For a thicker slurry the level may be lower for the deposition of the same thickness of cake. Another way to increase the thickness of the cake for the thin slurry is to decrease the rate of rotation of the cylinder 102 which permits more time for filtrate to be drawn off while the cake also has more time to form and grow.

The filter cloth 107 of the rotating drum filter is covered by a wire winding which holds the cloth in place. This also saves wear on the filter cloth 107 where the knife 118 rides on the wire and not on the cloth. The drum suction filter supports are usually made of wood or of cast iron. In smaller numbers, they are made of non-corrosive materials. The filter medium may be cotton duck, cotton twill or other weave iron ware cloth and other metal wire cloth.

In another model of rotary drum continuous suction filter, the slurry basin may be smaller and set lower. By this arrangement a lengthening of the drying and washing periods and a free falling cake at discharge may result. The cake drops off largely by gravity and is called an invert discharge.

In another type of rotating drum continuous suction filter, the filtering surface is on the inside of the drum and the suction lines are on the outside. The drum is lying on its side and is rotated about its horizontal axis. One end is closed and the other end is opened for the entry of the feed and the discharge of the cake. The slurry is carried into the space formed by the inner cylinder and part of the end walls. The filtrate is carried by the suction lines to a rotating valve. The cake may be washed and the wash water drawn away separately. The filtering surface consists of filter cloth mounted in panels, each underlain by one or more shallow troughs terminating at the suction pipe through which the filtrate, as well as air, is pulled away to the receivers and pumps. The slurry lies in the basis formed by the filtering medium and is kept at a definite level. The feedline enters through the open end. The cake forms both by the effect of suction and by gravity settling of the heavier particles.

As the cake emerges from the slurry, water is sprayed inside the drum and is sucked through the cake. The wash water is collected separately by connecting the proper ports in the suction valve to the wash water receiver line. As the cake reaches the point past the zenith, the suction is cut off and an air blow admitted which distends the cloth in one panel and causes the cake to drop onto a screw or belt conveyor.

Following removal of the minerals or salts, the clay slurry is fed into an electrofiltration device for further processing.

The kaolin clay suspension may also be demineralized using diafiltration. Diafiltration is a membrane separation process whereby diafiltration fluid, such as water, is added to the membrane-retained species. Diafiltration processing is applied to industrial-scale ultrafiltration operations either (1) to improve the purity of membrane-retained species or (2) to improve the recovery of membrane-permeable species.

In ultrafiltration, membrane-retained compounds of a suspension are concentrated while freely permeable solids are transmitted essentially unchanged in concentration into the permeate stream. The ratio of permeate transport or flux decreases as the membrane-retained solids concentration increases. The degree of permeable solids recovery which is economically attainable directly with ultrafiltration, is therefore limited by the concentration in the retentate stream.

In diafiltration, retentate concentration is reduced by water addition while permeate continues to be withdrawn, thereby improving the degree of separation between membrane-retained and membrane-permeable species. When water addition equals permeate withdrawal, the operation is analogous to conventional filtration cake washing.

Figure 5A:
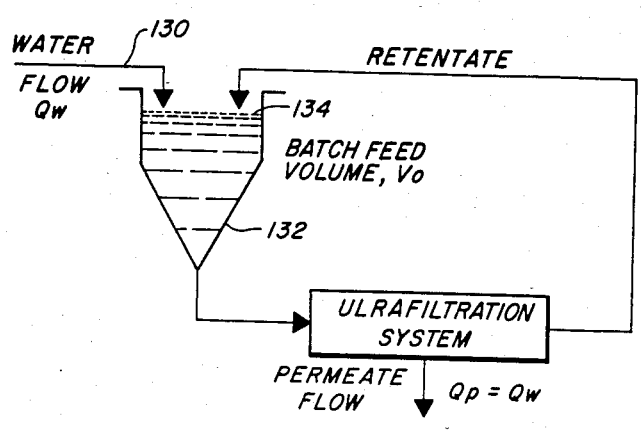
FIG. 5a describes an embodiment of the present invention wherein constant-volume batch diafiltration is used to demineralize a suspension of solids.
Figure 5B:
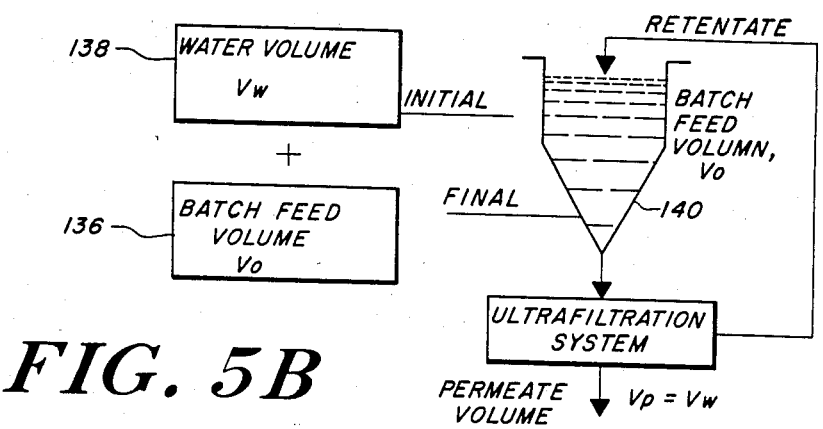
FIG. 5b describes another embodiment of the present invention wherein sequential batch diafiltration is used to demineralize a suspension of solids.
Figure 5C:
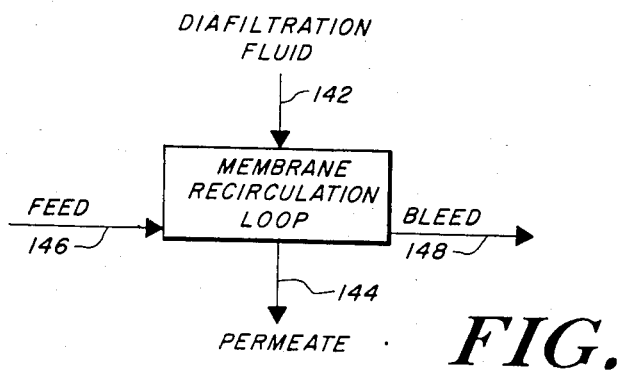
FIG. 5c describes another embodiment of the present invention wherein continuous diafiltration is used to demineralize a suspension of solids.

As shown in FIGS. 5a, 5b, and 5c, diafiltration may be employed in both batch and continuous processing modes. FIG. 5a describes a constant-volume batch diafiltration wherein diafiltering water 130 is added to the feed tank 132 to maintain a constant volume 134. FIG. 5b describes a sequential dilution bath diafiltration wherein the contents of the feed tank 136 are initially diluted with water 138 and then reconcentrated to the original volume 140. The dilution-concentration sequence may be repeated several times to achieve the required degree of separation. In continuous processing, as shown in FIG. 5c, diafiltration water 142 is introduced into each stage at the same rate as permeate 144 is withdrawn. Feed 146 is withdrawn at 148 at the same rate as it is introduced. As the number of stages increases, the system efficiency approaches that of a constant-volume batch operation.

In both constant-volume and sequential dilution batch diafiltration modes, the retained-solids concentration is unchanged between initial and final conditions and the permeate stream becomes more dilute with increasing recovery of permeable solids. There is an optimum retentate concentration at which to diafilter, which is a function of overall objectives and can be designed to minimize either membrane area requirements or water usage (dilution of permeate solids).

In a process wherein a kaolin clay suspension is to be demineralized, the kaolin clay particles do not pass through the membrane but are retained while the ions and other small contaminants pass through the membrane.

Objectives to consider in applications employing both ultrafiltration and diafiltration include: (a) minimizing membrane area-time requirements necessary to achieve the desired turnover ratio, N, or (b) minimizing the quantity of diafiltration water to be employed, thereby maximizing the permeate solids concentration from combined diafiltration and ultrafiltration operations. Membrane area-time should be optimized when the retained solids, as in kaolin clay demineralization, are of primary value. Minimization of diafiltration water should be optimized when dilution of the permeate solids results in additional costs downstream recovery operations as applied to the permeate stream.

If the batch retentate volume is reduced before diafiltration, the area-time required for diafiltration will also decrease. However, the increase in retained-solids concentration results in a flux decrease which tends to offset a portion of the gain from operating at minimum volume. The optimum concentration at which to diafilter is, therefore, determined by balancing the decreasing volume to be processed against the decreasing processing rate. Constant-volume diafiltration is preferable to sequential batch operations for minimizing membrane area-time requirements since the operation is carried out at the optimum diafiltration-condition for the whole duration of the batch process.

In sequential dilution batch diafiltration, the permeable solids content is reduced by initial dilution of the batch volume followed by subsequent reconcentration of the fluid until the original retained-solids concentration is attained.

Continuous diafiltration may be in a single or in multiple stages. It may also be used to effect both concentration and diafiltration within a single stage by adjusting the ratio of wasted flow to be less than permeate flow. Batch diafiltration, either at constant volume or with dilution-reconcentration, may conveniently be carried out by addition of diafiltration water to the batch feed tank. Constant tank volume can be maintained by the use of a ball float-valve or by means of a liquid level controller.

In continuous diafiltration for single-stage systems or for the first stage in a multistage system, the diafiltration water can be introduced via an intermediate feed tank at the head of the system. For subsequent stages, diafiltration water must be pumped into the recirculation loops.

To control the diafiltration process, flowmeters must be installed on the permeate and diafiltration water lines at each of the stages. Since the permeate flow rate is not normally controlled (unrestricted membrane permeation to atmospheric pressure), the diafiltration water flow must be adjusted to equal the permeate flow. This can be achieved either manually, by periodic adjustment of the water flow control valve, or automatically, by means of a flow-ratio controller. Normally, the water permeate flow ratio will be 1:1, but smaller ratios are also allowable if it is necessary to both concentrate and diafilter in one stage.

High quality process water (preferably demineralized), free of colloidal and suspended solids, should be used in diafiltration processing.

The invention is further illustrated by the following non-limiting example.

EXAMPLE

Approximately 165 pounds of 30% kaolin by weight was prepared and diafiltered via an Iopor TM series L filter. The diafiltration lowered the conductivity of the clay from approximately 1200 micromhos to 460 micromhos at a pH of 7.16. The diafiltered clay was electrofiltered in a conventional millileaf; the anode membrane was a bag, the cathode membranes were dynel TM cloth, the electrode gap was one inch, and the filtrate/anolyte vacuum was 15 inches of Hg. A seven minute downtime at a current density of 13.6 amps/ft$^2$ (5 amps) was employed. The electrolyte used was 30,000 micromhos $Na_2SO_4NaOH$ buffer, to maintain an electrolyte pH of approximately 7. The results of this experiment were compared with a control sample of 30% kaolin by weight, not diafiltered. There were six test runs. The diafiltered clay feed contained 29.2% solids by weight, a pH of 7.16, and a conductivity of 460 micromhos. The non-diafiltered control feed contained 28.9% solids by weight, a pH of 6.62, and a conductivity of 1370 micromhos. The energy requirements for the diafiltered and control samples are shown for each run in Table 1. Product properties of the cake, bath, filtrates (A and B), and electrolyte are given in Table 2. These results show that diafiltering the clay prior to electrofiltration produces a much higher throughput (gram/amp-min) at approximately twice the operating voltage.

TABLE 1

| | Energy Requirements | | | | | | | | | | | |
|---|---|---|---|---|---|---|---|---|---|---|---|---|
| | Diafiltered | | | | | | Non-Diafiltered | | | | | |
| Run | 1 | 2 | 3 | 4 | 5 | 6 | 1 | 2 | 3 | 4 | 5 | 6 |
| Potential volts | 60 | 58 | 58 | 58 | 58 | 58 | 29 | 27.5 | 25 | 25 | 24 | 23 |
| Filtrate rates | 130 | 115 | 130 | 100 | 105 | 85 | 60 | 47.5 | 47.5 | 45 | 35 | 37.5 |
| A/B mls/min | 130 | 100 | 115 | 100 | 85 | 75 | 55 | 52.5 | 47.5 | 43 | 40 | 50 |

TABLE 2

| Run | Product Properties | | | | | | | | | | | |
|---|---|---|---|---|---|---|---|---|---|---|---|---|
| | Diafiltered | | | | | | Non-Diafiltered | | | | | |
| | 1 | 2 | 3 | 4 | 5 | 6 | 1 | 2 | 3 | 4 | 5 | 6 |
| CAKE | | | | | | | | | | | | |
| % Solids | 65.5 | 79.3 | 79.5 | 79.7 | 80.9 | 80.5 | 78.5 | 76.2 | 75.4 | 75.1 | 75.9 | 74.5 |
| pH | 7.19 | 7.55 | 7.62 | 7.67 | 7.78 | 7.92 | — | 6.52 | 6.12 | 5.85 | 5.45 | 5.38 |
| Conductivity micromhos | 750 | 560 | 1000 | 960 | 700 | 500 | — | 1200 | 1300 | 1500 | 1500 | 1040 |
| BATH | | | | | | | | | | | | |
| % Solids | 23.2 | 26.4 | 24.5 | 24.1 | 23.1 | 22.9 | 29.5 | 30.1 | 30.0 | 30.3 | 30.1 | 25.3 |
| pH | 7.38 | 7.40 | 8.13 | 8.15 | 8.27 | 8.55 | 6.60 | 6.70 | 6.90 | 7.00 | 7.10 | 7.38 |
| Conductivity micromhos | 540 | 550 | 590 | 580 | 600 | 610 | 1330 | 1380 | 1500 | 1590 | 1600 | 1620 |
| FILTRATE A | | | | | | | | | | | | |
| % Solids | 3.1 | 1.9 | 1.1 | 0.7 | 0.5 | 0.3 | 4.6 | 3.6 | 2.8 | 2.3 | 2.4 | 2.4 |
| pH | 11.67 | 11.87 | 12.01 | 11.96 | 12.01 | 12.08 | 11.40 | 11.90 | 12.05 | 12.15 | 12.15 | 12.20 |
| Conductivity micromhos | 1700 | 2450 | 2900 | 3000 | 3300 | 3000 | 1990 | 4200 | 5375 | 6100 | 6800 | 7300 |
| FILTRATE B | | | | | | | | | | | | |
| % Solids | 1.3 | 0.9 | 0.7 | 0.4 | 0.3 | 0.2 | 1.9 | 1.9 | 1.8 | 1.7 | 1.5 | 2.2 |
| pH | 11.72 | 11.90 | 11.98 | 11.92 | 12.15 | 11.99 | 11.50 | 11.90 | 12.09 | 12.14 | 12.19 | 12.20 |
| Conductivity micromhos | 1850 | 2400 | 2950 | 3200 | 3200 | 3100 | 2050 | 4380 | 5900 | 6590 | 7020 | 7500 |
| ELECTROLYTE | | | | | | | | | | | | |
| % Solids | 2.6 | — | 3.4 | — | 3.3 | 2.2 | 2.3 | 2.4 | — | — | 2.8 | — |
| pH | 8.70 | — | 10.40 | — | 10.97 | 9.60 | 3.20 | 2.70 | — | — | 2.15 | — |
| Conductivity micromhos | 30,000 | — | 26,000 | — | 25,000 | 26,000 | 29,000 | 30,000 | — | — | 33,200 | — |

Although the invention has been described with reference to its preferred embodiment, other embodiments can achieve the same results. Variations and modifications of the present invention will be obvious to those skilled in the art and it is intended to cover in the appended claims all such modifications and equivalents.

I claim:

1. A process for dewatering a liquid suspension of solids subject to the influence of an electric field, which comprises the steps of:
   (a) demineralizing the suspension of solids to lower the conductivity of the suspension;
   (b) subjecting said suspension of solids which has been demineralized in step (a) to an electric field within an electrically augmented vacuum filter;
   (c) concentrating said suspension of solids by forming a slurry or solids cake on an electrode surface of said electrically augmented vacuum filter; and
   (d) removing the slurry or solids cake formed in step (c) from the electrode surface.

2. The process of claim 1 wherein the suspension of solids is demineralized by electrodialysis.

3. The process of claim 1 wherein the suspension of solids is demineralized by dialysis.

4. The process of claim 1 wherein the suspension of solids is demineralized by filtration.

5. The process of claim 1 wherein the suspension of solids is demineralized by diafiltration.

6. The process of claim 4 wherein the suspension of solids is demineralized by:
   (a) forming a solids cake on a perforated rotary drum;
   (b) applying a vacuum to the solids cake through said drum to remove liquid from said solids cake; and
   (c) washing said solids cake to remove said minerals.

7. A system for dewatering a liquid suspension of solids subject to the influence of an electric field, which comprises:
   (a) means for removing minerals from said suspension of solids; and
   (b) means for removing liquid from said suspension of solids at a first electrode structure and depositing solids from said suspension of solids on a counter electrode structure, said means comprising:
   an electrically augmented vacuum filter,
   a source of direct current,
   means for collecting said solids deposited on said counter electrode structure, and
   means for collecting said liquid removed at said first electrode structure.

8. The system for dewatering a suspension of solids of claim 7 wherein said means for removing said minerals is an apparatus for electrodialysis.

9. The system for dewatering a suspension of solids of claim 7 wherein said means for removing said minerals is an apparatus for dialysis.

10. The system for dewatering a suspension of solids of claim 7 wherein said means for removing said minerals is an apparatus for filtration.

11. The system for dewatering a suspension of solids of claim 10 wherein said filtration means is a rotating drum continuous suction filter.

12. The system for dewatering a suspension of solids of claim 7 wherein said means for removing said minerals is an apparatus for diafiltration.

* * * * *